Oct. 28, 1930.    N. A. CHRISTENSEN    1,779,875
BRAKE MECHANISM FOR AUTOMOTIVE VEHICLES
Original Filed April 30, 1928    2 Sheets-Sheet 1
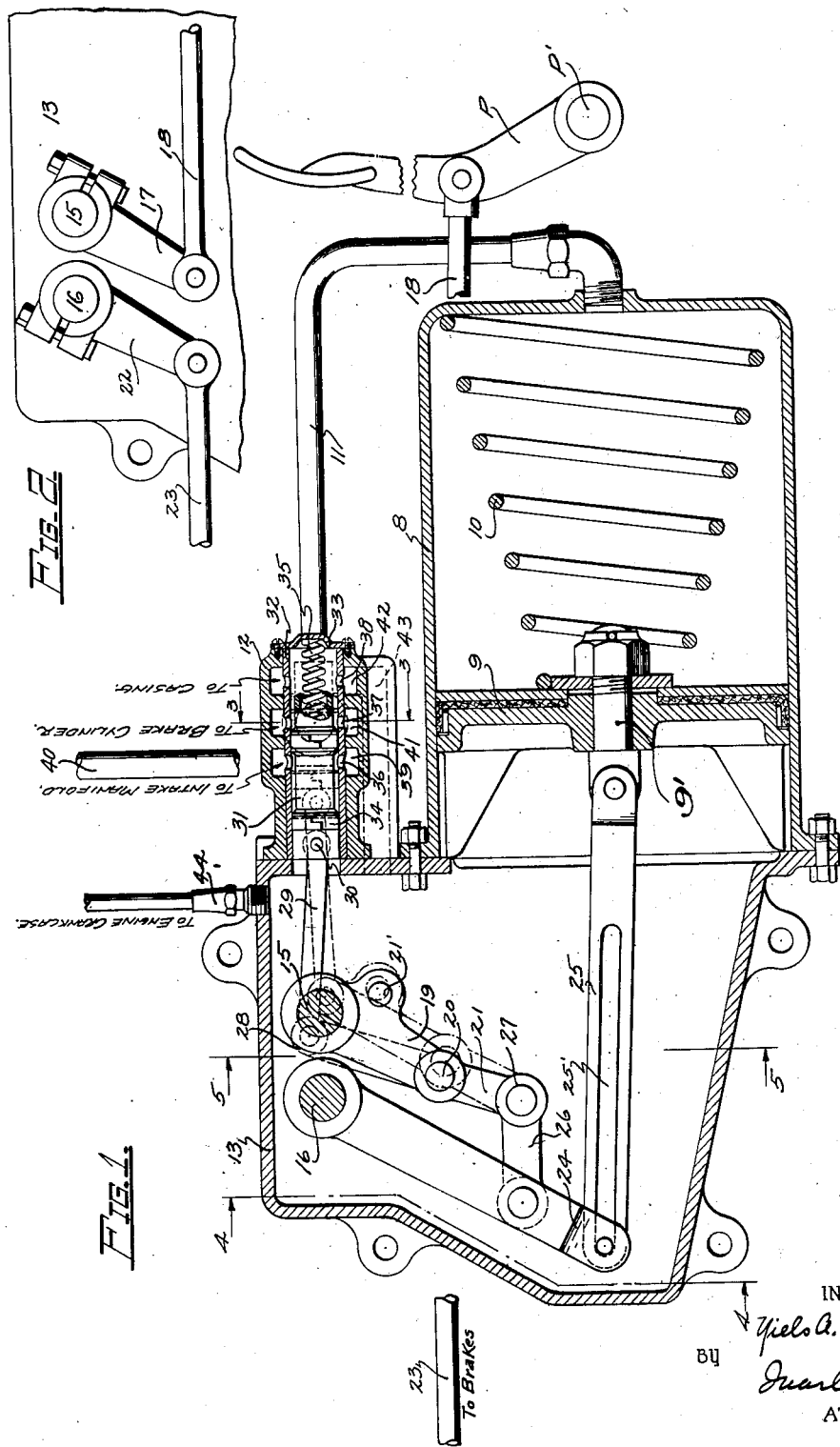
INVENTOR.
Niels A. Christensen
BY
Quarles & French
ATTORNEYS.

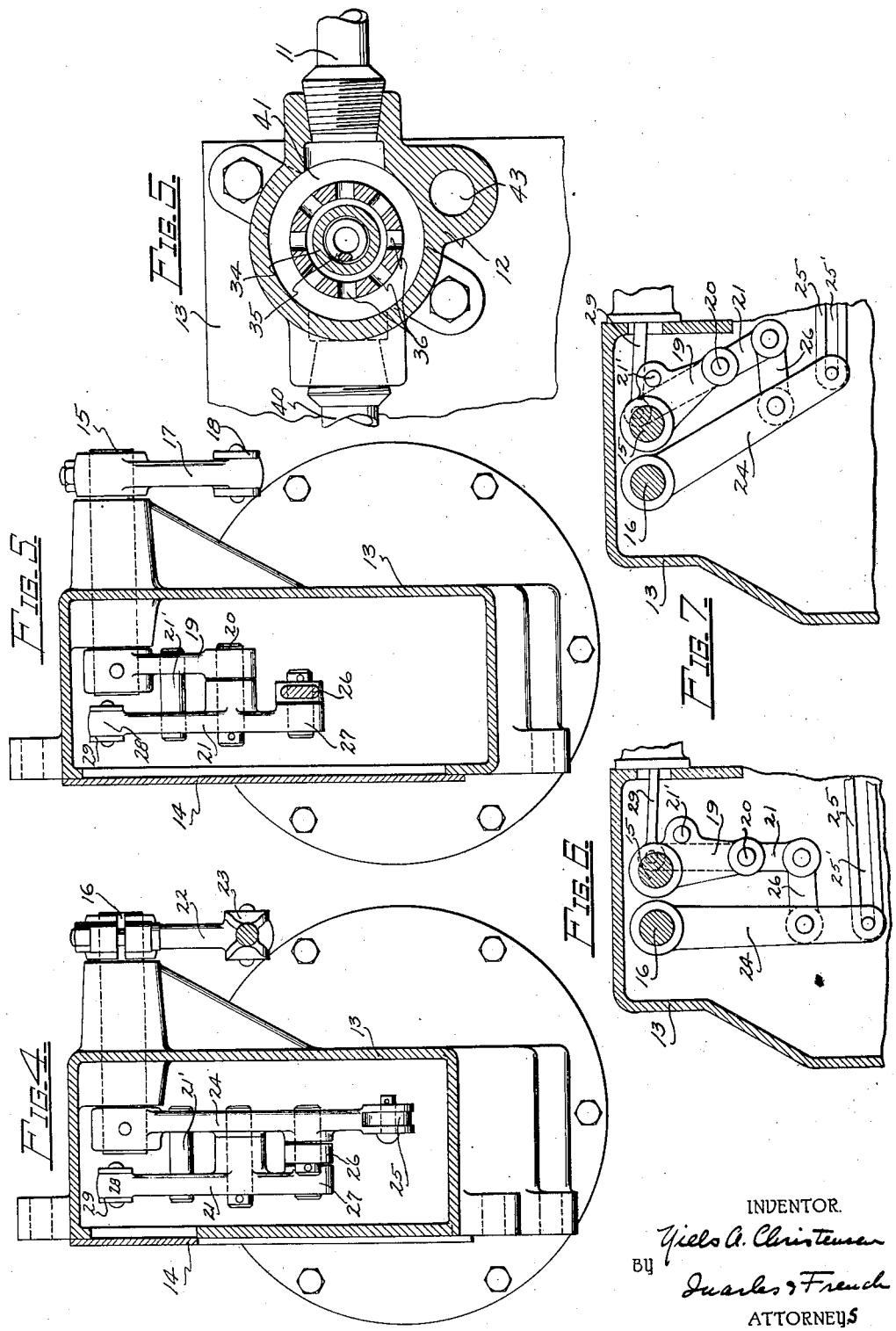

Patented Oct. 28, 1930

1,779,875

UNITED STATES PATENT OFFICE

NIELS A. CHRISTENSEN, OF CLEVELAND, OHIO

BRAKE MECHANISM FOR AUTOMOTIVE VEHICLES

Application filed April 30, 1928, Serial No. 273,901. Renewed September 2, 1930.

The invention relates to brake mechanism for automotive vehicles.

The object of this invention is to provide brake operating mechanism employing the general arrangement and combination of elements of that of my prior United States Patent No. 1,291,765, dated January 21, 1919, but more particularly where the power source of braking pressure is obtained by the suction of vacuum effect of the power plant of the vehicle.

The invention further consists in the several features hereinafter set forth and more particularly defined by claims at the conclusion hereof.

In the drawings Fig. 1 is a vertical sectional view through brake-operating apparatus embodying the invention;

Fig. 2 is a detail front view of parts of the apparatus;

Fig. 3 is a detail sectional view taken on the line 3—3 of Fig. 1;

Fig. 4 is a detail sectional view taken on the line 4—4 of Fig. 1;

Fig. 5 is a detail sectional view taken on the line 5—5 of Fig. 1;

Fig. 6 is a detail sectional view showing parts of the mechanism in Fig. 1 in one of their operative positions;

Fig. 7 is a view similar to Fig. 6, showing the parts in another operative position.

As in my prior Patent No. 1,291,765, the combination and arrangement of parts is such that the first movement of the foot pedal by the operator brings about the application of the power source to apply the brakes and a continued movement of the foot pedal may be used to augment this power application or may be used alone in case the power source is not available.

Referring to the drawings, the numeral 8 designates a brake cylinder having a piston 9 working therein and normally urged to a release position by a spring 10, the front end of said cylinder being connected by a pipe 11 to a valve casing 12 having valve mechanism therein controlling the connection of pipe 11 with the inlet manifold of the engine, whereby the vacuum created in said manifold will tend to exhaust the air from the brake cylinder 8 and thus cause an inward movement of the piston 9 and a consequent application of pressure to the brake mechanism connected to the piston.

The brake cylinder 8 is bolted or otherwise suitably secured to a casing 13 which in turn is adapted to be secured by brackets to the framework of the vehicle chassis, said housing being provided with a removable cover plate 14.

Shafts 15 and 16 are suitably journalled in the casing. The shaft 15 has a lever arm 17 secured thereto, outside the casing, and operatively connected by a link 18 to the operator's brake pedal P, pivoted at P', and has a lever arm 19 carrying pin 20 on its free end upon which a floating lever 21 is pivoted intermediate its ends.

The shaft 16 has a lever arm 22, outside said casing, connected to a brake rod 23 which is adapted to be connected in any suitable or known manner with the regular brake mechanism associated with the wheels of the vehicle and a lever arm 24, inside the casing, connected at its outer end by a rod 25 having a slotted end 25' or other means forming a lost motion connection with the piston bolt 9' and intermediate its ends by a link 26 with the inner or lower end 27 of the lever 21. The lever 21 is limited in its movement in one direction by a stop pin 21' mounted on the lever arm 19.

The upper end 28 of the lever 21 is connected by a connecting rod 29 with wrist-pin 30 of a piston valve 31 which works in a cylinder liner 32 in the valve casing 12 which also has an end cover plate 33 secured thereto and covering the outer end of the liner.

The piston valve has the usual sealing ring 34 associated therewith and is normally urged to release position by a spring 35 interposed between a recessed end of said valve 31 and the plate 33.

The liner has a series of ports 36, 37 and 38 formed therein, the ports 36 communicating with a chamber 39 which is connected by pipe 40 with the engine manifold (not shown), the ports 37 communicating with a chamber 41 which is connected by the pipe 11 to the brake cylinder and the ports 38 communicating with a chamber 42 which connects by a passage 43 with the interior of the casing 13.

The interior of the casing 13 is also connected by a pipe 44 to the crank case or the vent thereof of the engine.

With this construction, when the operator steps on the foot pedal P and swings it toward the right, as viewed in Fig. 1, the first movement of said pedal causes a forward movement of the link 18, thereby swinging the arms 17 and 19 and rocking the shaft 15 in counterclockwise direction, the link 26 being then held firmly by the release springs of the brake system by the action of said springs restraining the movement of the rod 23 and the levers 22 and 24, as will be readily understood by those familiar with this art, whereby that end of the link associated with the end 27 of the lever 21 forms a fulcrum for said lever which then, under the action of pin 20 moving with the arm 19, swings the upper end of said lever 21 toward the right, thereby moving the connecting rod 29 and the piston valve 31 associated therewith toward the right, compressing the spring 35 and establishing communication between the ports 37 and 36 so as to permit air to pass or be drawn out from the brake cylinder 8 through pipe 11 to the chamber 41, ports 37, space between the sealing heads of the valve, port 36, chamber 39, pipe 40 to the inlet manifold, thereby establishing a vacuum pressure in cylinder 8 equal to the vacuum existing in the engine manifold.

This reduction of pressure in the cylinder 8 will cause the piston 9 to move to the right and a displacement of this piston will draw in lubricant laden air through pipe 44 from the engine crank case. As the piston moves to the right, tension is placed on the rod 25 which in turn swings the lever 24 toward the right, which through the shaft 16 and arm 22 acts on the brake-operating rod 23 to make a brake application, the parts assuming the position shown in Fig. 6.

A movement of the foot pedal P by the operator, which brings the piston valve 31 in a position to establish vacuum connection between the brake cylinder and the intake manifold and causes the piston 9 to travel forward for a brake operation, will so long as the operator keeps his foot on the pedal in this position, produce a lap movement of the valve 31, since the outward travel of the piston 9 during a brake application will react through the linkage above described to move the valve 31 back to the lap position, in which the suction is cut off, but the valve has not moved to the release position, and this takes place on each forward movement of the pedal by the operator until such time as the operator's continued movement no longer is capable of producing a lapped position of the valve on the forward travel of the piston but will, through the link 18, arm 17, shaft 15, arm 19 and lever 21' produce a direct pull on the link 26 to produce a manual movement of the lever 24 and the brake mechanism associated therewith; causing the lever 19 and lever 21 to move together under these conditions, while rod 29 remains in a position to keep the intake manifold pressure on. Thereafter a continued movement of the foot pedal will, through the link 18, arm 17, shaft 15, arm 19 and lever 21, produce a direct pull on the link 26 to produce a manual movement of lever 24 and the brake mechanism associated therewith, pin 21' causing the lever 19 and lever 21 to move together under these conditions while rod 29 remains in a position to keep the intake manifold pressure on.

If, on any given movement of the foot pedal to a position in which the piston 9 is moved to produce a brake application, the operator desires to release the braking pressure to any extent, a slight release of the pressure on the foot pedal P, permitting it to travel backward, will cause a corresponding backward movement of the valve 31 through the linkage above described to the release position to allow a certain release of vacuum pressure in the brake cylinder to produce the desired brake application pressure.

When the operator relieves his pressure on the foot pedal the valve 31 is free to move back to the position shown in Fig. 1, under the action of the spring 35, and the brake release mechanism is free to act upon the brake and the rod 23 to move it to a release position, thereby restoring the levers 24, 19 and 21 to their release position shown in Fig. 1. As soon as the piston valve returns to the position shown in Fig. 1, equilibrium of pressure is established between the space in front of the piston 9 and the space including the casing 3 behind the piston, since the ports 37, chamber 41, ports 38, chamber 42 and passage 43 then establish communication between pipe 11 and casing 13 which is connected to atmosphere through the pipe 44 and the crank case of the engine so that the piston travels to a release position under the action of the spring 10.

As the crank case air carries oil vapors in suspension, this air, on being drawn into the casing 13 and the rear end of the brake cylinder and into the passage 43 and through the valve mechanism and the pipe 11 to the other end of the brake cylinder, will serve to lubricate the moving parts of the mechanism.

I desire it to be understood that this invention is not to be limited to any particular form or arrangement of parts except in so far as such limitations are included in the claims.

What I claim as my invention is:

1. In brake-operating apparatus for automotive vehicles, the combination with a brake cylinder, a piston working therein, a casing associated with the brake cylinder, a valve housing, valve mechanism in said housing, an operator-controlled-and-actuated member and a brake actuator, of a pair of shafts, means connecting said operator-controlled member with one of said shafts, means connecting said brake actuator with the other of said shafts, means connecting said last-named shaft with the piston, a floating lever associated with the first-named shaft and operatively connected with said valve, linkage connecting said floating lever with said second-named shaft, and means for restraining the movement of said floating lever in one direction, said valve mechanism controlling communication between said brake cylinder and the intake manifold of the engine and between said cylinder and atmosphere.

2. In brake-operating apparatus for automotive vehicles, the combination with a brake cylinder, a piston working therein, a casing associated with the brake cylinder, a valve housing, valve mechanism in said housing and controlling communication between the intake manifold and atmosphere, said valve housing having communication with said brake cylinder, of a pair of shafts, one of said shafts being manually operable and carrying a lever arm, a floating lever pivoted intermediate its ends to said lever arm, means connecting one end of said floating lever to said valve mechanism, brake-operating means connected to the other of said shafts, means connecting said last-named shaft to said piston, and means including a link connecting said last-named shaft and the other end of said floating lever together.

3. In brake-operating apparatus for automotive vehicles, the combination with a brake cylinder, a piston working therein, a casing associated with the brake cylinder, a valve housing, valve mechanism in said housing and controlling communication between the intake manifold and atmosphere, said valve housing having communication with said brake cylinder, of a pair of shafts, one of said shafts being manually operable and carrying a lever arm, a floating lever pivoted intermediate its ends to said lever arm, means connecting one end of said floating lever to said valve mechanism, the other of said shafts carrying a lever arm, a lost motion connection between said last-named arm and said piston, a link connection between said last-named arm and the other end of said floating lever, and brake-operating means connected to said last-named shaft.

4. In brake-operating apparatus for automotive vehicles, the combination with a brake cylinder, a piston working therein, of a casing upon which said cylinder is mounted, a valve housing, valve mechanism in said housing and controlling communication between the intake manifold and atmosphere, said valve housing having communication with said brake cylinder, a pair of shafts journaled in one side of said casing, one of said shafts being manually operable and carrying a lever arm within said casing, a floating lever pivoted intermediate its ends to said lever arm, means within said casing connecting one end of said floating lever to said valve mechanism, brake-operating means connected to the other of said shafts, means within said casing including a lever arm connecting said last-named shaft to said piston, and a link connecting said last-named lever arm and the other end of said floating lever together.

In testimony whereof, I affix my signature.

NIELS A. CHRISTENSEN.